United States Patent [19]

Wallace et al.

[11] 4,454,046

[45] Jun. 12, 1984

[54] BOILER SCALE PREVENTION EMPLOYING AN ORGANIC CHELANT

[75] Inventors: Steven L. Wallace, Lake Jackson; Freddie Griffin, Jr., Missouri City; Thorwald J. Tvedt, Jr., Angleton, all of Tex.

[73] Assignee: The Dow Chemical Company, Midland, Mich.

[21] Appl. No.: 415,069

[22] Filed: Sep. 7, 1982

[51] Int. Cl.$^3$ .............................................. C02F 5/12
[52] U.S. Cl. ................................... 210/698; 210/750; 252/180; 252/390; 422/13; 422/16
[58] Field of Search ............................ 210/696–701, 210/750, 757; 252/180, 181, 388, 389.1, 390; 422/13, 16, 17

[56] References Cited

U.S. PATENT DOCUMENTS

| | | | |
|---|---|---|---|
| 1,997,256 | 4/1935 | Hall | 210/697 |
| 3,099,521 | 7/1963 | Arensberg | 252/387 |
| 3,235,324 | 2/1966 | Merriman | 210/698 |
| 3,463,730 | 8/1969 | Booth et al. | 252/180 |
| 3,492,240 | 1/1970 | Hettinger | 210/701 |
| 3,527,609 | 9/1970 | Vinson | 210/698 |
| 3,549,538 | 12/1970 | Jacklin | 252/180 |
| 3,684,720 | 8/1972 | Richardson | 252/180 |
| 4,011,171 | 3/1977 | Lorenc et al. | 210/700 |
| 4,306,991 | 12/1981 | Hwa et al. | 210/699 |

FOREIGN PATENT DOCUMENTS 1696316 4/1972 Fed. Rep. of Germany ...... 210/387

*Primary Examiner*—Peter A. Hruskoci
*Attorney, Agent, or Firm*—A. C. Ancona

[57] ABSTRACT

An improved method of treating boiler water which employs an oxygen scavenging compound and a compound to control pH together with a chelating agent, wherein the chelating agent is hydroxyethylethylenediaminetriacetic acid.

4 Claims, No Drawings

BOILER SCALE PREVENTION EMPLOYING AN ORGANIC CHELANT

BACKGROUND OF THE INVENTION

Boilers used to generate steam have been treated with a variety of synthetic and naturally occurring chemicals in an effort to reduce the formation of scale on heat exchange surfaces. Scale, when of a sufficient thickness, tends to reduce heat transfer and in some instances produces metal overheating. When these problems are aggravated by large scale accumulation, rupture of the heat exchange surfaces can occur causing possible injury and requiring extended down-time for repairs.

In the effort to achieve greater efficiency in industrial boilers for the production of steam for industrial energy purposes, the trend of boiler design has been toward higher and higher operating pressures and temperatures. Careful studies have been made of the heat-transfer properties of structural metals, notably steels, with especial regard for the temperature gradient across the thickness of wall of a pressure-confining heat-transfer boiler member, typically a tube. Commonly, such tubes operate with one surface adjacent a heat source which is at a temperature substantially above the plastic temperature of steel, and the other surface at a lower temperature, as high as is possible to maintain with safety, while simultaneously effecting heat transfer through the wall of the said tube or the like at a rate which prevents the plasticizing and pressure deformation of the said tubes. As the steam pressure increases and the temperature gradient between the heat source and the steam zone decreases, it becomes imperative that heat transfer be efficient and rapid lest, failing of such transfer, the heat exchange unit structure becomes overheated and suffers plastic deformation and eventually, perhaps, rupture. In this situation, the deposit, on the water or steam side, of minerals in an insulating layer which impede heat transfer, even modestly, is intolerable.

The problem is particularly exaggerated in the instance of boilers used to supply steam to installations which may return no condensate to the boiler, so that all incoming water is new, or "make-up" water in the sense that it has not previously been, in effect, distilled by passage through the boiler. In this situation, there tends to be a gradual accumulation of minerals capable of forming intolerable deposits.

The removal of minerals from water to be used in boilers has been carefully studied. Installations making use of all of the best available techniques typically begin by treatment of the incoming untreated water with any of numerous flocculating or "settling" agents whereby to remove from the water substantial quantities of turbidity impurities, and leave a relatively clean water. This clean water is typically passed through filters to remove all possible suspended or settling particles. The filtered water may then be deionized. However, various serious problems persist despite all these processes. Thus, clay as a colloid can pass unmodified through all these processes, and at boiler temperatures it tends to break up, yielding within the boiler calcium++, magnesium++, aluminum+++, and silicate—ions in the boiler water. Further, these ions recombine under boiler conditions yielding various mineral substances.

The problem has been mitigated to some extent by the employment of known chemical additives. Various phosphates, any of which, under boiler conditions, becomes converted to an ortho phosphate of some kind, are added because they tend to form complexes with calcium and maintain it in some form in the nature of a suspension. However, when a phosphate is employed alone and at pH of about 9 to 10.5, protection from calcium may be achieved but a tenacious adhesive magnesium phosphate tends to form and develop an insulating coating on the interior (water) surface of the boiler tubes in an intolerable degree.

Magnesium as a problem is mitigated to some extent by inclusion of sodium hydroxide in the boiler water. At a pH which may be in the neighborhood of 11, the hydroxide ion is sufficiently abundant that magnesium predominantly forms magnesium hydroxide, while silica and aluminum are maintained in the form of silicates and aluminates.

With these additions, the problem can be further mitigated by "blow down," that is to say, periodical or continuous removal from the boiler water, at a point of maximum concentration of solids, of a small part of the boiler water whereby some of the mineral components are removed.

A further and related problem of boiler maintenance has been the corrosion of iron and steel boiler tubes by oxygen in the presence of water. Various efforts are made to remove oxygen from the boiler water. In one method that is standard practice in large industrial boilers, the water, before admission to the boiler, is passed into a vessel whereinto live steam is injected under modest pressure. The water temperature is elevated whereby the solubility of oxygen is reduced, and the steam, in passing through, sweeps from the water most of the dissolved gases formerly present. However, after this treatment has been carried forward exhaustively, damaging traces of oxygen usually remain. These traces are frequently "scavenged" chemically. This is accomplished by adding to the boiler water a chemical which will react with the oxygen to bind it chemically and obtain a resulting reaction product that is harmless, or at least less harmful than the uncombined oxygen. The two most commonly used such substances are hydrazine and, preferably, sodium or other alkali metal sulfite. These substances, such as sulfite, are typically added as concentrated aqueous solution to the deaerator. Other chemicals are added through a "chemical feed line" whereby this and other chemical substances previously mentioned are introduced in more or less uniform concentration into the steam drum where the agitation of ebullition quickly disperses them uniformly into the boiler water. Also, sometimes, the oxygen scavenging chemical is introduced into the make-up water feed line to the boiler after steam deaeration, as noted.

Recently, in the attempt to solve the remaining problem of mineral deposits, chelating agents have been included in the chemical feed to the boiler steam drum in the hope that, by reaction with metallic ions, they would form water-soluble organometallic chelates of the objectionable mineral substances. The most widely used and most successful has been the tetrasodium salt of ethylenediaminetetraacetic acid (EDTANa$_4$). The inclusion of this substance in the chemical feed line through which are added also, typically, sodium hydroxide and a phosphate, has yielded good results in terms of protection of boiler interiors from formation of mineral deposits.

A later method for removing and inhibiting scale is disclosed in U.S. Pat. No. 3,549,538 wherein the treatment employs in combination a nitrilo compound, e.g.

the trisodium salt of nitrilotriacetic acid (NTA), and a water soluble polar addition polymer described as sulfoxy-free, e.g. polyacrylic acid or a maleic anhydridestyrene copolymer. Another patent (U.S. Pat. No. 3,492,240) employs a partially hydrolyzed polymer of polyacrylonitrile. A preferred amount of 50–80% carboxyl groups in the hydrolyzed polymer is taught. A more recent patent, U.S. Pat. No. 4,306,991 claims a combination of a copolymer of styrene sulfonic acid and maleic anhydride together with a water soluble organophosphonic acid compound, e.g. methylene diphosphonic acid.

Other amine polycarboxylic acid salts which are good chelating agents have also been suggested for use in boiler water scale inhibition. An important criterion in their selection is the stability of their chelates under the high temperature and pressure conditions found in boiler applications.

Boiler water is frequently treated with an oxygen scavenging compound and with compounds to control pH. The present invention relates to treatment of boiler water which is treated with such an oxygenscavenging compound, especially those compounds which are volatile such as hydrazine. Ammonia, another volatile compound, is added for pH control. The use of such volatile compounds is referred to as AVT (all volatile treatment). Another type of treatment different from the AVT process and alluded to above is that in which phosphates are used for pH control, sometimes in conjunction with ammonia. These are used with sulfite as an oxygen scavenger and with chelants to help control scale and corrosion.

It has been noted in the literature* that the thermal stability of a metal chelate was directly related to its formation constants. The log of the formation constants of Fe(II).NTA, Fe(II).HEDTA**, and Fe(II).EDTA are 8.8, 12.2, and 14.3, respectively. Thus, it was unexpected that HEDTA would exhibit 10 times the thermal stability of EDTA, and thus was effective and superior to EDTA for the prevention of scale in boilers.

*Ramunas J. Motekaitis, X. B. Cox, III, Patrick Taylor, Arthur E. Martell, Brad Miles, T. J. Tvedt, Jr.; Canadian Journal of Chemistry; Volume 60, Number 10, 1982.
**N-(2-Hydroxyethyl)ethylenediaminetriacetic acid

SUMMARY OF THE INVENTION

In the prevention of scale formation and passivation of metal surfaces in boilers, wherein a treatment is employed to remove oxygen and to control pH, and wherein a chelating agent is employed, it has been found that when hydroxyethylethylenediamine triacetic acid (HEDTA), or its salts, is employed more thermally stable metal chelates are formed than when other commonly used chelants, e.g. EDTA and NTA, are employed.

DETAILED DESCRIPTION OF THE INVENTION

It has been determined that HEDTA is superior to either NTA or EDTA in preventing boiler scale from metal ions such as $Fe^{++}$, $Ca^{++}$ and $Mg^{++}$. It also passivates the metal surfaces more rapidly than those two commonly used chelants. HEDTA may be used in acid form or in the form of an ammonium, alkali metal or amine salt or a combination thereof. Thus, for example, a triammonium, a disodium ammonium, a trisodium or an amine form of the chelant may be employed to form the metal chelate. It is advantageously employed at pH values of 7 to 12 and at pressures of 15 to 3200 psia which provides temperatures of 212° to 705° F. (100° to 374° C.), but may be employed at any temperature or pressure below the critical point for water. The HEDTA is used with respect to the metal ions present in ratios within the range of from about 1 to 10 moles of chelant per mole of metal ions. A preferred amount is from about 1.2 to 2 moles per mole of metal ions.

Experiments were run to simulate the action of HEDTA in a boiler and metal passivation tests were run on various metal coupons.

REPRESENTATIVE PROCEDURE

All experiments were conducted in a two-liter titanium autoclave. Titanium was selected because it is inert under the conditions employed. In addition to the autoclave, the reactor also included a two-element heating mantle and a temperature controller. A typical experiment was conducted as follows:

A two-liter titanium reactor was bolted in an upright position and equipped with a gas sparge tube, sample tube, and vent line. The test solution was poured into the reactor via a $\frac{3}{8}''$ compression fitting which was plugged during the run. The reactor was heated by a two-element, 3 KW heater. A Variac was connected to the upper element and a temperature controller to the lower element.

The test solution was prepared by dissolving 1.97 g (0.026 mole) of $Ca(OH)_2$ and 7.77 g (0.026 mole) of EDTA in about 300 ml of deionized water which had been distilled in glass. The pH was then raised to about 9.7 with ammonium hydroxide to dissolve the solids on the bottom. The resulting solution was quantitatively transferred to a 2-liter graduated cylinder and diluted to volume. Finally, 150 µl of a stock 0.5% $N_2H_4$ solution was added. After adding a magnetic stirring bar, the contents was stirred for 10–20 minutes.

The reactor was assembled, leak tested, and purged with high purity nitrogen. Feed was introduced into the reactor by removing both the vent line and the $\frac{3}{8}''$ compression fitting plug. A small nitrogen purge was maintained as the test solution was introduced to the reactor. The reactor was sealed immediately and purged overnight with high purity nitrogen after which both heating elements were turned on. As the internal reactor temperature approached 20°–50° C. below the desired temperature, the Variac was turned off. The temperature controller then maintained the desired reactor temperature.

Samples were collected through a water-cooled, counter-current, 304 stainless steel heat exchanger. An $\frac{1}{8}''$ needle valve was used to control the sample flow from the reactor. Prior to sample collection, 5–10 mls of the solution was discarded. The sample valve was never opened far enough to allow the sample to escape as steam.

Table I shows the half-lives of various iron, calcium and magnesium chelates.

TABLE I

| Chelate | pH | Temp. (°C.) | Half-life (hrs.) |
| --- | --- | --- | --- |
| Ex. 1 - Iron | | | |
| Fe(II).NTA | 9.5 | 290* | <0.08 |
| Fe(II).EDTA | 9.3 | " | 0.25 |
| Fe(II).HEDTA | 9.6 | 291 | 2.8 |
| Ex. 2 - Calcium | | | |
| Ca.EDTA | 9.5 | 272 | 0.18 |
| " | " | 250 | 1.7 |
| " | " | 230 | 6.5 |

TABLE I-continued

| Chelate | pH | Temp. (°C.) | Half-life (hrs.) |
|---|---|---|---|
| " | 8.5 | " | 8.1 |
| Ca.HEDTA | 7.7 | 290 | 2.4 |
| " | 8.7 | " | 3.1 |
| " | 9.5 | " | 3.9 |
| " | " | 300 | 3.2 |
| " | " | 310 | 2.6 |
| Ex. 3 - Magnesium | | | |
| Mg.EDTA | 9.5 | 290 | 1.4 |
| Mg.HEDTA | 7.3 | " | 6.7 |
| " | 8.1 | " | 8.8 |
| " | 8.9 | " | 5.9 |
| " | 9.5 | " | 1.7 |

*Decomposed on heating

Passivation studies were made on carbon steel and a nickel-cobalt alloy. The experiments are described as follows:

All tests were conducted in a dynamic loop. Fresh solvent was continuously introduced into the bottom of the autoclave and spent solvent was continuously removed from the top. Residence time of the solvent in a steam generator was simulated.

These data were used to predict the passivation rates which should be expected in the steam generator. The main feed tank was large enough to hold fifty gallons of solution, thus permitting several days of operation on a single charge. The main feed tank was equipped with a nitrogen purge to insure that the dissolved oxygen level was less than 20 ppb. Periodic sampling of the main feed tank was performed which confirmed the above dissolved oxygen level. The pump was capable of pressurizing the solution to reactor pressure. The reactor was operated at a pressure slightly higher than the saturation pressure. The surge tank served two functions. First, it smoothed pressure surges, thus, providing stable pressure in the reactor. Second, it allowed small quantities of dissolved nitrogen to escape prior to entering the reactor. The reactor was heated by an electric heating mantle which, in turn, was temperature controlled. A small heat exchanger was used to cool the solution to ambient temperature prior to the reduction of pressure by the pressure control valve. At no time was the sample permitted to flash across the pressure control valve.

The coupons were arranged on a rack. The sample rack was constructed from 304 stainless steel rod. The rack ends were ⅜" rod, and the sides ¼" rod. Holes, 9/64" in diameter, were drilled at 1½", 5½", and 9½" from the bottom of the sample rack on both sides to allow one-eight O.D. stainless steel tubing to support the test coupons. The stainless steel tubing was covered with ¼" O.D.×⅛" I.D. FEP TEFLON ® tubing in order to electrically isolate the coupons from the rack. Coupon separators were constructed from ⅜" O.D., FEP TEFLON ® tubing in order to electrically isolate the coupons from each other. One specimen coupon (1"×1½"×0.06") of each alloy was placed on each row of the rack. The position of each specimen was carefully noted, and after an examination, each coupon was returned to the same position. This procedure allowed the position of the coupon within the reactor to be evaluated.

Prior to the initial exposure, all coupons were scoured using hydrochloric acid and pumice. This procedure removed all oxides from the surface of the coupons, leaving the surface active to corrosion. Following this procedure, the coupons were carefully stored in a desicator in order to prevent rusting. After exposure to the test solution, the coupons were washed with IVORY ® Soap so that only loosely adhering deposits were removed. The passive film was not removed using the milder procedure.

Weight losses were determined after each exposure interval by subtracting the coupon weight (after scrubbing with IVORY ® soap) from its weight prior to the exposure. Weight losses when evaluated as a function of time were found to satisfy the following equation:

$$W = W_i(1 - e^{-kt})$$

where
 $W$ = weight loss at time t
 $W_i$ = weight loss at infinite time
 $k$ = passivation rate constant Thus a large value of the passivation rate constant implies a rapid passivation rate. The loss of weight during scrubbing with IVORY ® bar soap was used to estimate the quantity of corrosion products which had loosely adhered to the coupons during an exposure. All weighings were on an analytical balance.

Table II shows the passivation rate constants for different carbon steels and a nickel-cobalt alloy.

TABLE II

| Example | Metal* | EDTA (day$^{-1}$) | HEDTA (day$^{-1}$) |
|---|---|---|---|
| 4 | SA 516 | 0.10 | 0.18 |
| 5 | SA 285C | 0.064 | 0.20 |
| 6 | SA 508 | 0.095 | 0.16 |
| 7 | SA 533 | 0.089 | 0.16 |
| 8 | Inconel ® 600 | 0.076 | 4.0 |

*The carbon steel coupons shown have ASME designations which indicate the composition and heat treatment.
Inconel 600 is a nickel-cobalt alloy.

HEDTA is also effective in boiler scale prevention and metal passivation when used in conjunction with other known boiler treating methods. Thus, for example, the use of sodium sulfite as an oxygen scavenger and a mixture of di- and tri-sodium phosphates for pH control. The use of hydrazine-ammonia with phosphate in conjunction with HEDTA is also useful.

We claim:

1. In a process for the prevention of scale and corrosion in boilers from water containing $Fe^{++}$, $Ca^{++}$, or $Mg^{++}$ ions wherein the boiler water is treated with an effective amount of hydrazine as an oxygen scavenger, ammonium hydroxide as a pH control compound and a chelating compound, and wherein the pH is controlled at a value of from about 7 to about 12, the temperature is from about 100° to about 374° C., and the pressure is from about 15 to about 3200 psia the improvement which comprises adding to the boiler water as the chelating compound hydroxyethylethylenediaminetriacetic acid in an amount of from about 1 to about 10 moles of chelant per mole of scale or corrosion producing metal ions present.

2. The process of claim 1 wherein the hydroxyethylethylenediaminetriacetic acid is added in the form of an alkali metal, ammonia or amine salts or a combination thereof.

3. The process of claim 2 wherein the pH of the boiler water is from 9 to 10.

4. The process of claim 1 or 2 wherein the chelating agent is employed in a ratio from about 1.2 to 2 for each mole of metal ion.

* * * * *

UNITED STATES PATENT AND TRADEMARK OFFICE
CERTIFICATE OF CORRECTION

PATENT NO. : 4,454,046
DATED : June 12, 1984
INVENTOR(S) : Steven L. Wallace, Freddie Griffin, Jr., Thorwald J. Tvedt, Jr.

It is certified that error appears in the above—identified patent and that said Letters Patent is hereby corrected as shown below:

Column 1, line 62, "silicate—ions" should read --silicate-- ions--.

Column 5, line 51, "one-eight" should read --one-eighth--.

Signed and Sealed this

Twenty-sixth Day of March 1985

[SEAL]

Attest:

DONALD J. QUIGG

Attesting Officer

Acting Commissioner of Patents and Trademarks

UNITED STATES PATENT AND TRADEMARK OFFICE
CERTIFICATE OF CORRECTION

PATENT NO. : 4,454,046

DATED : June 12, 1984

INVENTOR(S) : Steven L. Wallace, Freddie Griffin, Jr. and Thorwald J. Tvedt, Jr.

It is certified that error appears in the above-identified patent and that said Letters Patent is hereby corrected as shown below:

Insert the following at Column 1, line 15 as the second paragraph:

--The Government has rights in this invention pursuant to Contract No. DE-AC02-79ET34015 awarded by the U.S. Department of Energy.--

Signed and Sealed this
Eighteenth Day of November, 1986

Attest:

DONALD J. QUIGG

Attesting Officer     Commissioner of Patents and Trademarks